US012410043B2

(12) United States Patent
Fenton

(10) Patent No.: US 12,410,043 B2
(45) **Date of Patent: *Sep. 9, 2025**

(54) EXTENDABLE PLATFORM LIFT ASSEMBLY

(71) Applicant: Fenton Mobility Products, Inc., Randolph, NY (US)

(72) Inventor: Scott Ivan Fenton, Sinclairville, NY (US)

(73) Assignee: Fenton Mobility Products, Inc., Randolf, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,364

(22) Filed: Oct. 2, 2023

(65) Prior Publication Data

US 2024/0025713 A1 Jan. 25, 2024

Related U.S. Application Data

(63) Continuation of application No. 17/020,986, filed on Sep. 15, 2020, now Pat. No. 11,840,434.

(60) Provisional application No. 62/902,642, filed on Sep. 19, 2019.

(51) Int. Cl.
*B66F 7/06* (2006.01)
*A61G 3/06* (2006.01)
*B66F 7/28* (2006.01)

(52) U.S. Cl.
CPC ............ *B66F 7/0641* (2013.01); *A61G 3/062* (2013.01); *A61G 3/067* (2016.11); *B66F 7/0633* (2013.01); *B66F 7/28* (2013.01); *Y10S 414/134* (2013.01)

(58) Field of Classification Search
CPC ... B64D 9/00; B64D 2009/006; B66F 7/0633; B66F 7/0641
See application file for complete search history.

(56) References Cited

U.S. PATENT DOCUMENTS

| | | | | |
|---|---|---|---|---|
| 4,486,048 A * | 12/1984 | Meyer | A61G 5/12 297/DIG. 4 |
| 6,039,528 A | 3/2000 | Cohn | |
| 8,033,589 B2 * | 10/2011 | Kusanagi | B60N 2/045 296/68.1 |
| 2010/0329831 A1 | 12/2010 | Tornese et al. | |
| 2012/0219395 A1 | 8/2012 | Inaguma et al. | |
| 2019/0388287 A1 | 12/2019 | Bryant | |

FOREIGN PATENT DOCUMENTS

| | | |
|---|---|---|
| FR | 2594389 | 8/1987 |
| GB | 2353267 | 2/2001 |

* cited by examiner

*Primary Examiner* — Saul Rodriguez
*Assistant Examiner* — Willie W Berry, Jr.
(74) *Attorney, Agent, or Firm* — Harter Secrest & Emery LLP; Michael Nicholas Vranjes

(57) ABSTRACT

An extendable lift assembly for a vehicle, including a sliding rail assembly, including a plate slidably connected to the vehicle, and a knuckle arm pivotably connected to the plate, a first platform pivotably connected to the knuckle arm, and a second platform extending from and pivotably connected to the plate.

20 Claims, 10 Drawing Sheets

EXTENDABLE PLATFORM LIFT ASSEMBLY

CROSS-REFERENCE TO RELATED APPLICATIONS

This application is filed under 35 U.S.C. § 120 as a continuation of U.S. patent application Ser. No. 17/020,986, filed on Sep. 15, 2020, which application claims the benefit under 35 U.S.C. § 119(e) of U.S. Provisional Patent Application No. 62/902,642, filed Sep. 19, 2019, which applications are incorporated herein by reference in their entireties.

FIELD

The present disclosure relates to the field of lifts, and more particularly, to an extendable lift for entering and exiting a vehicle.

BACKGROUND

Platform lifts for vehicles are well known for accommodating wheelchairs. Specifically, platform lifts for vehicles are designed carry a user seated in a wheelchair onto and off of a vehicle, such as a van. However, current lift designs are bulky and take up a large amount of space within the vehicle. Additionally, current lift designs don't account for standing users, or users who are not seated in a wheelchair but need assistance entering and exiting a vehicle so as to avoid dangerous steps.

Thus, there is a long felt need for a platform lift assembly that extends out of a vehicle opening, such as a doorway, to retrieve a user and carries the user into the vehicle and can be stowed away therein.

SUMMARY

According to aspects illustrated herein, there is provided an extendable lift assembly for a vehicle, comprising a sliding rail assembly, including a plate slidably connected to the vehicle, and a knuckle arm pivotably connected to the plate, a first platform pivotably connected to the knuckle arm, and a second platform extending from and pivotably connected to the plate.

In some embodiments, the extendable lift assembly further comprises a static rail operatively arranged to be fixedly secured to the vehicle, wherein the plate is slidingly connected to the static rail. In some embodiments, the extendable lift assembly further comprises a motor including a gear, wherein the motor and the gear are operatively arranged to displace the plate with respect to the static rail. In some embodiments, the extendable lift assembly further comprises a rack connected to the plate, wherein the gear is operatively arranged to engage the rack. In some embodiments, the extendable lift assembly further comprises a lever operatively arranged to engage and disengage the gear from the rack.

In some embodiments, the first platform is connected to the knuckle arm via a shaft. In some embodiments, the first platform is further connected to the knuckle arm via a rod, the rod being pivotably connected to the knuckle arm and pivotably and slidably connected to the first platform. In some embodiments, the knuckle arm is connected to the plate via a shaft. In some embodiments, the first platform is rotatable in a first circumferential direction relative to the knuckle arm and a second circumferential direction, opposite the first circumferential direction, and the knuckle arm is rotatable in a third circumferential direction relative to the plate and a fourth circumferential direction, opposite the third circumferential direction.

In some embodiments, the extendable lift assembly further comprises a bridge plate hingedly connected to the first platform. In some embodiments, the extendable lift assembly further comprises an actuator connected at a first end to the bridge plate and at a second end to the first platform, the actuator operatively arranged to circumferentially displace both the bridge plate and the first platform. In some embodiments, the extendable lift assembly further comprises a locking plate slidably connected to the plate, and a pin connected to the knuckle arm, wherein the locking plate is operatively arranged to engage the pin to non-rotatably connect the knuckle arm and the plate.

In some embodiments, the knuckle arm comprises an arm pivotably connected thereto, and the static rail comprises a slot, wherein the arm is operatively arranged to engage the slot to circumferentially displace the knuckle arm. In some embodiments the second platform is a seat for a user. In some embodiments, the extendable lift assembly further comprises a drive mechanism operatively arranged to displace the plate with respect to extend and retract the plate.

According to aspects illustrated herein, there is provided an extendable lift assembly for a vehicle operatively arranged to extend from proximate a floor of the vehicle to proximate a ground surface, the extendable lift assembly comprising a static rail operatively arranged to be fixedly secured to the vehicle, a sliding rail assembly, including a plate slidably connected to the static rail, and a knuckle arm pivotably connected to the plate, a first platform pivotably connected to the knuckle arm, a second platform pivotably connected to the plate, and a drive mechanism operatively arranged to displace the sliding rail assembly with respect to the static rail.

In some embodiments, at least one of the first platform and the second platform is operatively arranged to carry a user into and out of the vehicle. In some embodiments, the first platform is rotatable in a first circumferential direction relative to the plate and a second circumferential direction, opposite the first circumferential direction, and the first platform is rotatable in a third circumferential direction relative to the plate and a fourth circumferential direction, opposite the third circumferential direction. In some embodiments, the second platform is rotatable in a fifth circumferential direction relative to the plate and a sixth circumferential direction, opposite the fifth circumferential direction.

According to aspects illustrated herein, there is provided an extendable lift assembly for a motor vehicle, comprising a sliding rail assembly, including a plate slidably connected to the vehicle, and a knuckle arm pivotably connected to the plate, a first platform pivotably connected to the knuckle arm, and a second platform extending from and pivotably connected to the plate.

According to aspects illustrated herein, there is provided an extendable lift assembly, comprising a sliding rail assembly, including a plate and a knuckle arm pivotably connected to the plate, and a first platform pivotably connected to the knuckle arm.

In some embodiments, the extendable lift assembly further comprises a static rail operatively arranged to be connected to a vehicle, wherein the sliding rail assembly is slidingly connected to the static rail. In some embodiments, the extendable lift assembly further comprises a motor including a gear, wherein the motor and the gear are operatively arranged to displace the sliding rail assembly with respect to the static rail. In some embodiments, the extendable lift assembly further comprises a rack connected to the plate, wherein the gear is operatively arranged to engage the rack. In some embodiments, the extendable lift assembly further comprises a lever operatively arranged to engage and disengage the gear from the rack. In some embodiments, the first platform is connected to the knuckle arm via a shaft. In some embodiments, the first platform is further connected to the knuckle arm via a rod, the rod being pivotably connected to the knuckle arm and pivotably and slidably connected to the first platform. In some embodiments, the knuckle arm is connected to the plate via a shaft. In some embodiments, the first platform is rotatable in a first circumferential direction relative to the knuckle arm and a second circumferential direction, opposite the first circumferential direction, and the knuckle arm is rotatable in a third circumferential direction relative to the plate and a fourth circumferential direction, oppo site the third circumferential direction. In some embodiments, the extendable lift assembly further comprises a second platform connected to the sliding rail assembly. In some embodiments, the second platform is hingedly connected to the plate. In some embodiments, the extendable lift assembly further comprises a bridge plate hingedly connected to the first platform. In some embodiments, the extendable lift assembly further comprises an actuator connected at a first end to the bridge plate and at a second end to the first platform, the actuator operatively arranged to circumferentially displace both the bridge plate and the platform. In some embodiments, the extendable lift assembly further comprises a locking plate slidably connected to the plate, and a pin connected to the knuckle arm, wherein the locking plate is operatively arranged to engage the pin to non-rotatably connect the knuckle arm and the plate. In some embodiments, the knuckle arm comprises an arm pivotably connected thereto, and the static rail comprises a slot, wherein the arm is operatively arranged to engage the slot to circumferentially displace the knuckle arm.

According to aspects illustrated herein, there is provided an extendable lift assembly for a vehicle operatively arranged to extend from proximate a floor of the vehicle to proximate a ground surface, the extendable lift assembly comprising a static rail connected to the vehicle, a sliding rail assembly, including a plate slidably connected to the static rail, and a knuckle arm pivotably connected to the plate, a first platform pivotably connected to the knuckle arm, and a drive mechanism, including a motor connected to the static rail, and a gear connected to the motor, the gear operatively arranged to displace the sliding rail assembly with respect to the static rail.

In some embodiments, the extendable lift assembly further comprises a rack connected to the plate, wherein the gear is operatively arranged to engage the rack. In some embodiments, the first platform is rotatable in a first circumferential direction relative to the plate and a second circumferential direction, opposite the first circumferential direction, and the first platform is rotatable in a third circumferential direction relative to the plate and a fourth circumferential direction, opposite the third circumferential direction. In some embodiments, the extendable lift assembly further comprises a bridge plate hingedly connected to the first platform, the bridge plate rotatable in a first circumferential direction relative to the plate and a second circumferential direction, opposite the first circumferential direction. In some embodiments, the extendable lift assembly further comprises a second platform connected to the sliding rail assembly.

According to aspects illustrated herein, there is provided an extendable lift assembly for a vehicle, comprising a sliding rail assembly, including a plate slidably connected to the vehicle, and a knuckle arm pivotably connected to the plate, and at least one first platform pivotably connected to the sliding rail assembly.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
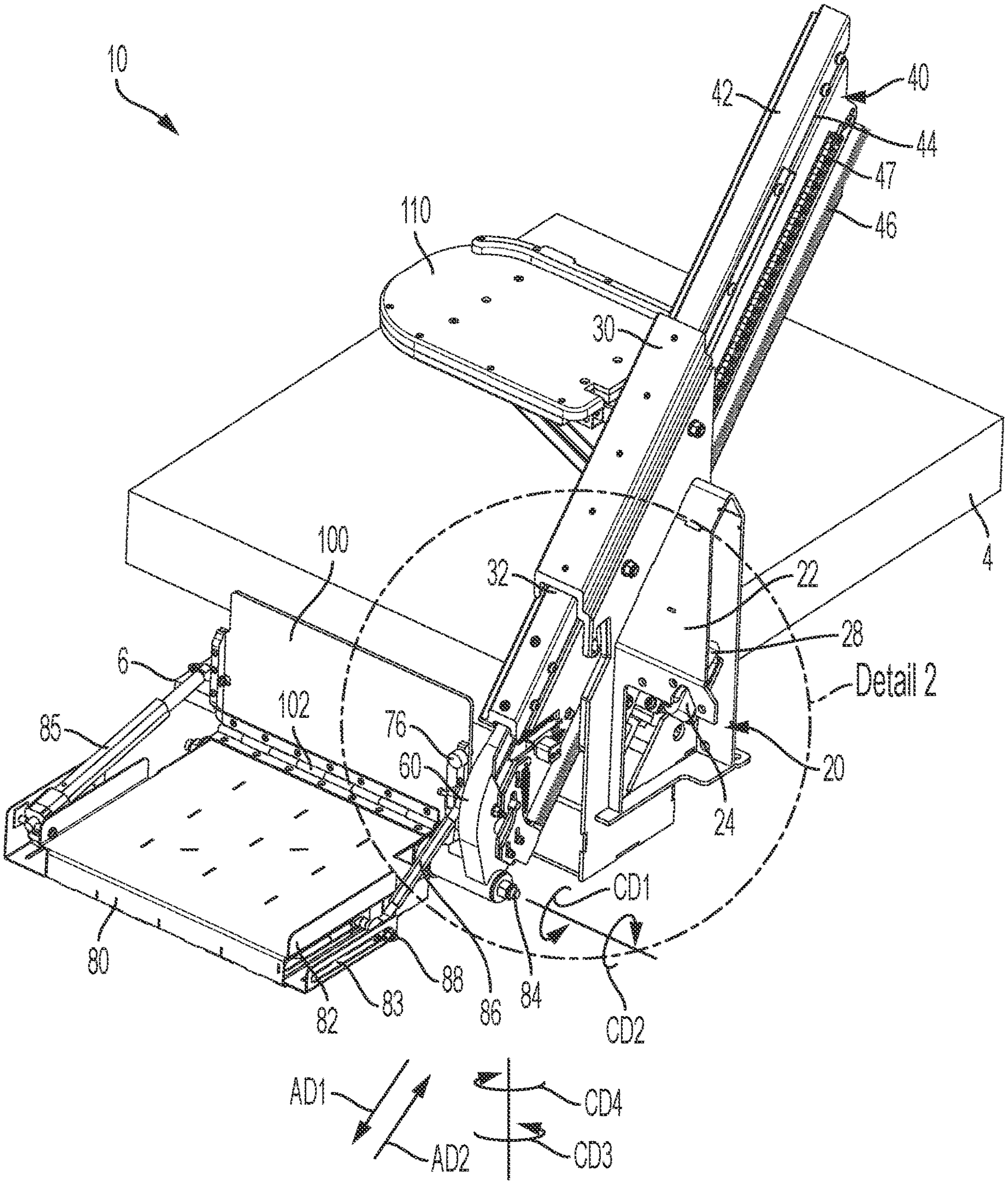
FIG. 1A is a perspective view of an extendable lift assembly, in an extended position.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, actuators (e.g., screw drive), and/or springs.

It should be appreciated that the term “substantially” is synonymous with terms such as “nearly,” “very nearly,” “about,” “approximately,” “around,” “bordering on,” “close to,” “essentially,” “in the neighborhood of,” “in the vicinity of,” etc., and such terms may be used interchangeably as appearing in the specification and claims. It should be appreciated that the term “proximate” is synonymous with terms such as “nearby,” “close,” “adjacent,” “neighboring,” “immediate,” “adjoining,” etc., and such terms may be used interchangeably as appearing in the specification and claims.

The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1B:
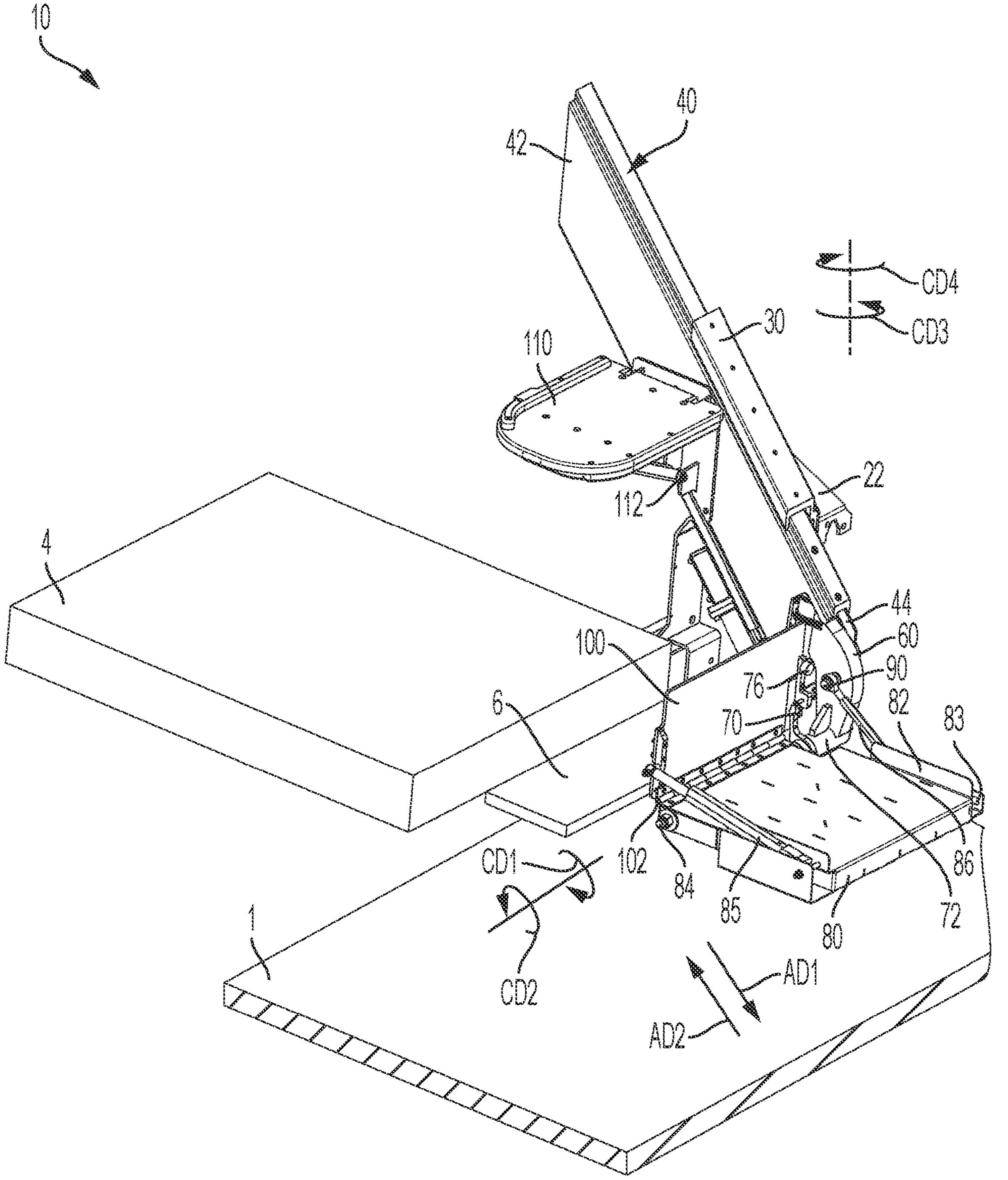
FIG. 1B is a perspective view of the extendable lift assembly shown in FIG. 1A.
Figure 2:
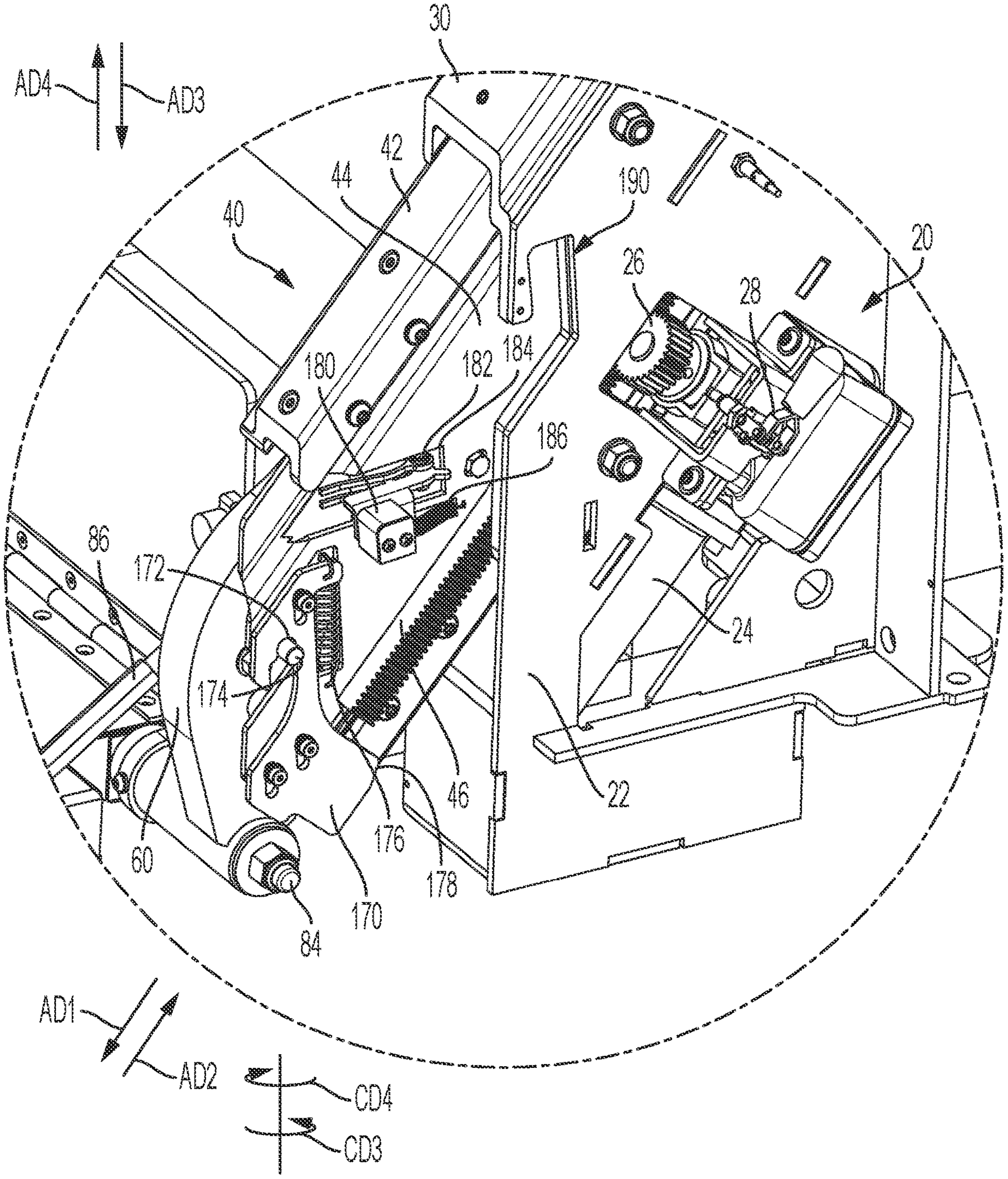
FIG. 2 is a detail view of the extendable lift assembly taken generally at Detail 2 in FIG. 1A.
Figure 3:
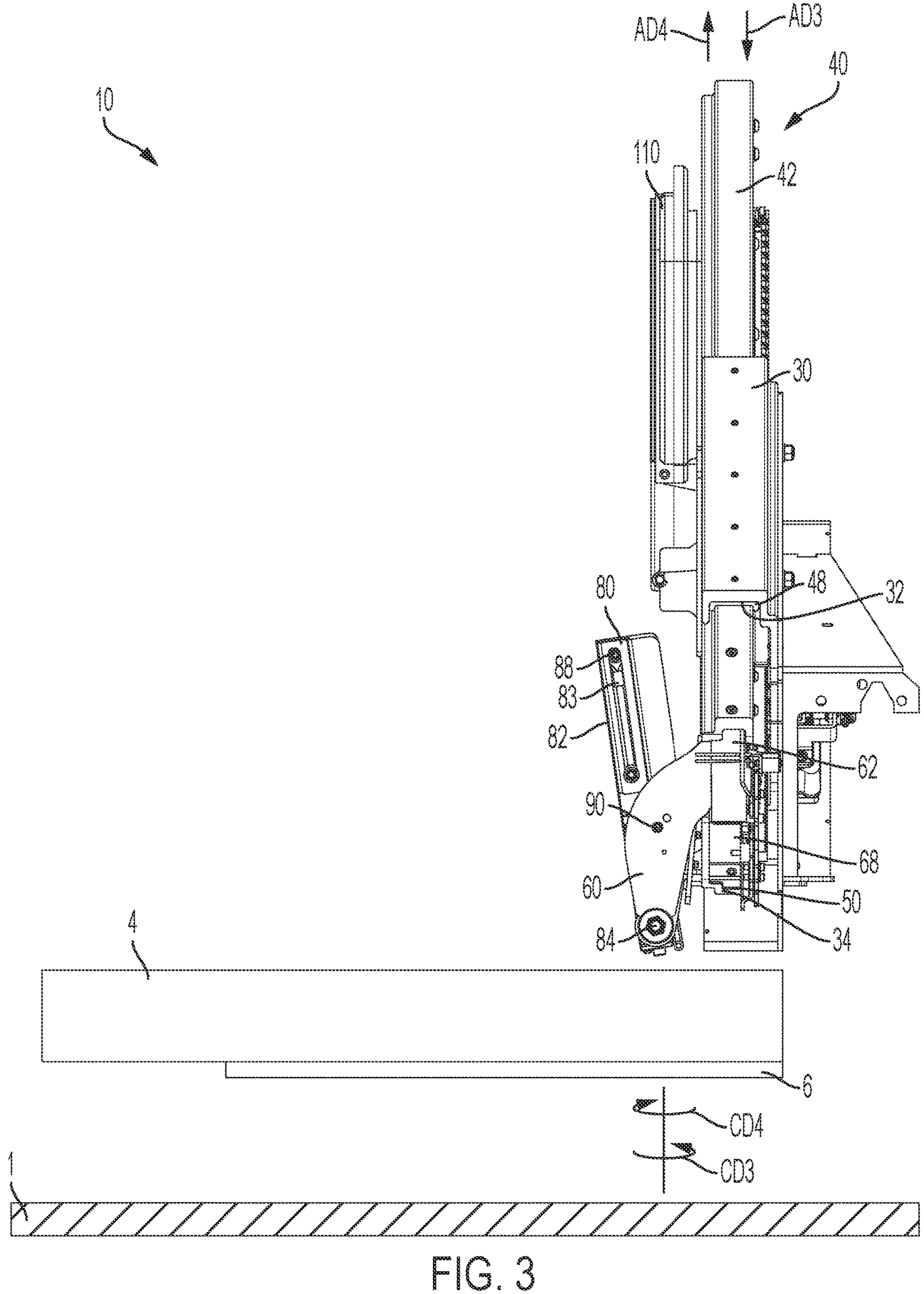
FIG. 3 is a front elevational view of the extendable lift assembly shown in FIG. 1A, in a fully stowed position.

Referring now to the figures, FIG. 1A is a perspective view of extendable lift assembly 10, in a partially extended position. FIG. 1B is a perspective view of extendable lift assembly 10. FIG. 2 is a detail view of extendable lift assembly 10 taken generally at Detail 2. FIG. 3 is a front elevational view of extendable lift assembly 10, in a fully stowed position. Extendable lift assembly 10 generally comprises static rail 30, sliding rail assembly 40, and at least one platform (e.g., platform 80 and/or platform 110). In some embodiments, extendable lift assembly 10 further comprises motor assembly 20. The following description should be read in view of FIGS. 1-9.

Static rail 30 is operatively arranged to be connected to the vehicle, for example, the B pillar of the vehicle. Static rail 30 comprises channel 32 and channel 34 (see FIG. 3). Static rail 30 is operatively arranged to slidably engage sliding rail assembly 40. In some embodiments, static rail 30 further comprises inserts 48 and 50. Inserts 48 and 50 are arranged in channels 32 and 34, respectively. Inserts 48 and 50 comprise a material that allows better sliding engagement between sliding rail assembly 40 and static rail 30. For example, inserts 48 and 50 may be fixedly secured in channels 32 and 34, respectively, and may comprise a polymer with a low coefficient of friction. Inserts 48 and 50 may be connected to static rail 30 via any suitable means, for example, rivets, screws, bolts, welding, soldering, adhesives, press fit, etc.

Sliding rail assembly 40 comprises plate 42, plate 44, rack 46, and knuckle arm 60. Plate 42 is slidingly engaged with static rail 30, and specifically inserts 48 and 50. Plate 44 is connected to plate 42. In some embodiments, plate 42 and plate 44 are integrally formed. Rack 46 is connected to plate 44. Rack 46 comprises a plurality of teeth operatively arranged to engage gear 26, as will be described in greater detail below. Knuckle arm 60 is pivotably connected to plate 42 via blocks 66 and 68 and shaft 64 (see FIG. 8). Knuckle arm 60 and its various components will be described in greater detail below. It should be appreciated that in some embodiments, sliding rail assembly 40 comprises a plurality of telescoping members that extend and retract with respect to static rail 30. Sliding rail assembly 40 is operatively arranged to extend in axial direction AD1 to extend platform 80 and/or platform 110 to the user. For example, sliding rail assembly 40 may extend in axial direction AD1 until platform 80 is flush with ground surface 1. Once a user has boarded platform 80 or platform 110, sliding rail assembly 40 is operatively arranged to retract in axial direction AD2 to carry the user into the vehicle. The main purpose of the extendable lift assembly 10 is to allow users to bypass stair(s) 6 of the vehicle. As such, sliding rail assembly 40 extends and retracts platform 80 and/or platform 110 over stair(s) 6.

In some embodiments, extendable lift assembly 10 further comprises motor assembly 20. Motor assembly 20 is connected to static rail 30 and is operatively arranged to drive sliding rail assembly 40. Motor assembly 20 comprises motor housing 22, motor 24, and gear 26. The output shaft of motor 24 is non-rotatably connected to gear 26. Gear 26 is operatively arranged to engage rack 46 of sliding rail assembly. As motor 24 rotates in a first circumferential direction, gear 26 drives rack 46 in a first linear direction thereby extending sliding rail assembly 40 and platform 80 (and/or platform 110) out of the vehicle and toward ground surface 1 (i.e., in axial direction AD1). As motor 24 rotates in a second circumferential direction, opposite the first circumferential direction, gear 26 drives rack 46 in a second linear direction, opposite the first linear direction, thereby retracting sliding rail assembly 40 and platform 80 (and/or platform 110) back in the vehicle (i.e., in axial direction AD2). In some embodiments, motor assembly 20 further comprises gear engagement lever 28. Gear engagement lever 28 is connected to gear 26 and is operatively arranged to engage gear 26 with rack 46 and disengage gear 26 from rack 46. For example, in a disengaged mode (not shown), gear engagement lever 28 separates gear 26 from rack 46 such that the teeth of gear 26 are fully disengaged from the teeth of rack 46. In an engaged mode (as best shown in FIG. 2), gear engagement lever 28 displaces gear 26 toward rack 46 such that the teeth of gear 26 are engaged with the teeth of rack 46. As such, if the power of the vehicle fails and motor 24 cannot be activated, gear 26 can be disengaged from rack 46 and sliding rail assembly 40 can be manually retracted within the vehicle. In some embodiments, and as shown in FIGS. 1A-2, motor 24 is mounted underneath static rail 30. Specifically, a plate of motor assembly 20 is fixedly secured to static rail 30 and motor 24 is fixedly secured to the plate. The shaft of motor 24 extends through the plate and connected to gear 26. Gear 26 engages rack 46 through an aperture in static rail 30 (see FIG. 2).

In some embodiments, motor 24 is controlled by a circuit (e.g., a high amperage circuit board), is used to displace sliding rail assembly 40 in axial directions AD1 and AD2. The circuit, for example, can be arranged as a main controller for lift assembly 10. In some embodiments, an encoder is arranged on gear 26 to communicate with the circuit to provide position data regarding sliding rail assembly 40 (i.e., is sliding rail assembly in the fully retracted position, the partially extended position, or the fully extended position). In some embodiments, communication between motor 24 and its control circuit, and the main controller occurs via Controller Area Network (CAN bus). In some embodiments, power and signal wires are fun down sliding rail assembly 40 using drag chain or conduit 47.

It should be appreciated that although the figures show the use of an electric motor as the drive mechanism, one having ordinary skill in the art would appreciate that any drive mechanism suitable for extending and retracting sliding rail assembly 40 and platform 80 (and/or platform 110) out of and back into a vehicle can be used (e.g., a hydraulic drive mechanism, a pneumatic drive mechanism, a manual drive mechanism, an actuator (e.g., screw drive), etc.).

Platform 80 is pivotably connected to knuckle arm 60 and is operatively arranged to rotate from a use position, as shown in FIGS. 1A-B, to a stowed position, as shown in FIG. 3. As shown in FIGS. 1A-B, in the use position, platform 80 is substantially parallel to vehicle floor 4 and ground surface 1. Platform 80 comprises plate 82 and is pivotably connected to knuckle arm 60 via shaft 84 and rod 86. Specifically, shaft 84 extends through platform 80 and knuckle arm 60. Knuckle arm 60 may comprise bushings and/or bearings in section 72 for rotatable connection to shaft 84. Similarly, platform 80 may comprise bushings and/or bearings for rotatable connection to shaft 84. In some embodiments, shaft 84 is rotatably connected to platform 80 and non-rotatably connected to knuckle arm 60. In some embodiments, shaft 84 is non-rotatably connected to platform 80 and rotatably connected to knuckle arm 60. In some embodiments, shaft 84 is rotatably connected to platform 80 and rotatably connected to knuckle arm 60. Rod 86 extends from knuckle arm 60 to plate 80, and is connected to plate 82. Rod 86 is rotatably connected to knuckle arm 60 via shaft 90 at a first end and rotatably and slidably connected to plate 82 at a second end, namely, channel 83. As shown in FIG. 1, for example, in the full use position, the second end of rod 86 abuts against a first end of channel 83. In the fully stowed position as shown in FIG. 3, for example, the second end of rod 86 abuts against the second end of channel 83. Rod 86 provides support to platform 80, similar to that of a truss. Rod 86 further imposes a rotational limit on platform 80, such that platform 80 may only rotate to a position that is substantially parallel to vehicle floor 4 and ground surface 1. It should be appreciated that the length of rod 86 is adjustable (i.e., like a turnbuckle connecting rod).

Platform 80 is arranged to be rotated to the stowed and use positions, automatically, via actuator 85, as will be described in greater detail below. However, it should be appreciated that platform 80 may be manually lowered by a user to the use position or lifted to the stowed position. Additionally, platform 80 may be displaced between the use and stowed position via any suitable means, for example, a motor, hydraulics, pneumatics, etc. Platform 80 may be used to lift a standing user into and out of a vehicle. Platform 80 can be used to lift a wheelchair into and out of a vehicle. To shift from the fully stowed position (FIG. 3) to the use position (FIGS. 1A-B), knuckle arm 60 rotates in circumferential direction CD3 and platform 80 rotates in circumferential direction CD1. To shift from the use position (FIGS. 1A-B) to the fully stowed position (FIG. 3), platform 80 rotates in circumferential direction CD2 and knuckle arm 60 rotates in circumferential direction CD4.

Figure 9:
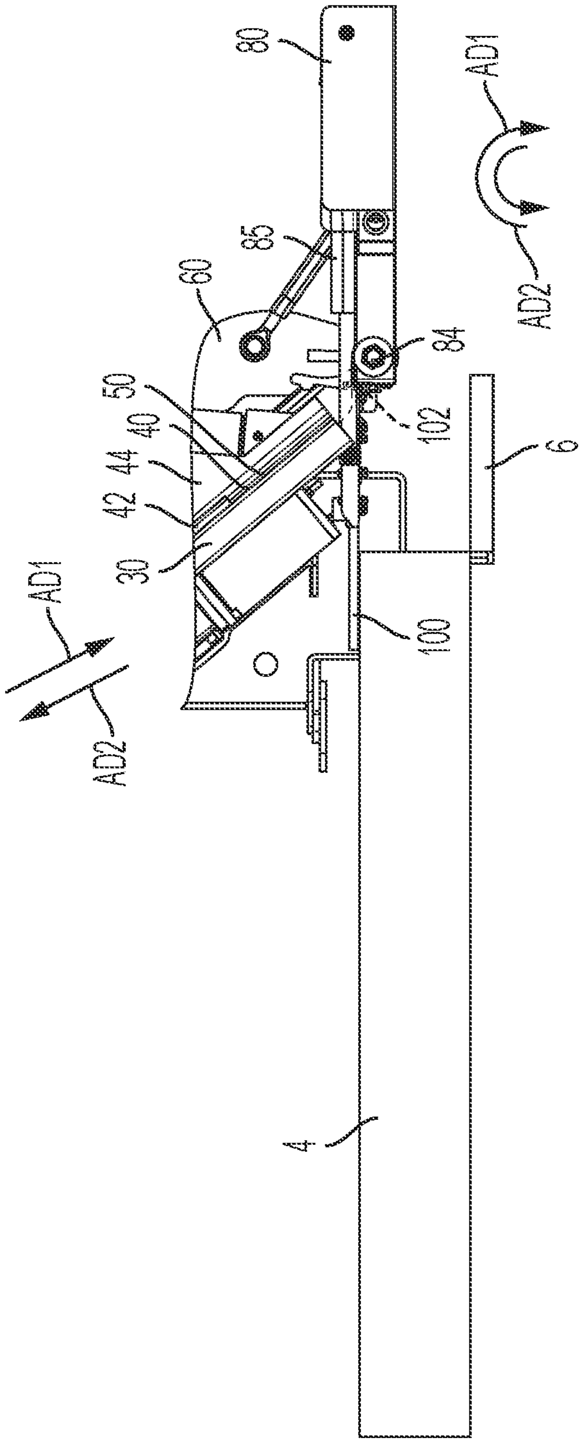
FIG. 9 is a partial side elevational view of an extendable lift assembly with the bridge plate in an extended position.

In some embodiments, extendable lift assembly 10 further comprises bridge plate 100. Bridge plate 100 is hingedly connected to platform 80 via hinge 102. Bridge plate 100 is operatively arranged to bridge the gap (if any) between platform 80 and vehicle floor 4, as shown in FIG. 9. Bridge plate 100 is operatively arranged to rotate in circumferential direction CD2 from the stowed position shown in FIG. 7 to the use position shown in FIG. 9. Once sliding rail assembly retracts platform 80 up to vehicle floor 4, actuator 85 can rotate bridge plate 100 in circumferential direction CD2 to the use position, shown in FIG. 9, and the user can step from or roll off of platform 80 onto vehicle floor 4. In some embodiments, bridge plate 100 is manually rotated to the use and stow position. In some embodiments, bridge 100 further comprises bumper 76 to prevent platform 80 from engaging bridge 100 (i.e., limit the rotational position of bridge plate 100). For example, as actuator 85 rotates platform 80 in circumferential CD2, platform 80 abuts against bumper 76 preventing the two (metal) plates from touching and being damaged. In some embodiments, bridge plate 100 is telescopingly engaged with platform 80. In such embodiments, bridge plate 100 extends out of an inner cavity of platform 80 to a use position, and retracts into the inner cavity of platform 80 in a stowed position.

Actuator 85 is pivotably connected at a first end to platform 80 and pivotably connected at a second end to bridge plate 100. In some embodiments, actuator 85 is an electric linear actuator. It should be appreciated, however, that actuator 85 may comprise any actuator suitable for displacing both platform 85 and bridge plate 100 to the use and stowed position, for example, hydraulic, pneumatic, mechanical, etc. In some embodiments, platform 85 is controlled using microcontroller 200 arranged within platform 80 (see FIG. 7). Microcontroller 200 communicates with the main controller in order to operate actuator 85 (i.e., microcontroller 200 runs actuator 85 to extend and retract). In some embodiments, actuator 85 comprises an encoder which provides position data to microcontroller 200 and main controller 200. As previously described, rod 86 is slidably and pivotably connected to platform 80 and limits the rotation of platform 80 in circumferential direction CD1. Specifically, rod 86 prevents platform 80 from displacing more than substantially parallel to ground surface 1 (see FIGS. 1A-B). Once platform is in its fully extended or use position (FIGS. 1A-B), actuator 85 can be more fully extended which will force bridge plate 100 to displace in circumferential direction CD2 toward vehicle floor 4. Actuator 85 will shut off once bridge plate 100 is fully extended and flush with vehicle floor 4 (see FIG. 9). Once the user steps into the vehicle from platform 80 and bridge plate 100, microcontroller 200 begins retracting bridge plate 100 in circumferential direction CD1 by simply retracting actuator 85. Once bridge plate 100 displaces to the fully stowed position it engages stopper 70 (see FIGS. 1B and 7). Stopper 70 is non-rotatably connected to section 72 of knuckle arm and limits displacement of bridge plate 100 in circumferential direction CD1. Once bridge plate 100 is engaged with stopper 70, further retraction of actuator 85 causes platform 80 to rotate in circumferential direction CD2. Actuator 85 will displace platform 80 in circumferential direction CD2 until platform 80 engages stopper 76.

Platform 110 is pivotably connected to sliding rail assembly 40. In some embodiments, platform 110 is pivotably connected to plate 42 via hinge 112. Hinge 112 may comprise a folding shelf bracket or an equivalent thereof, wherein platform 110 is capable of being raised to the use position (as shown in FIGS. 1A-B) and locked, as well as collapsed to a stowed position (not shown). In some embodiments, hinge 112 comprises one or more folding shelf brackets that lock at 90°, such that platform 110 is substantially parallel to vehicle floor 4 and ground surface 1. Platform 110 can be used to lift a seated user into and out of a vehicle.

Figure 4:
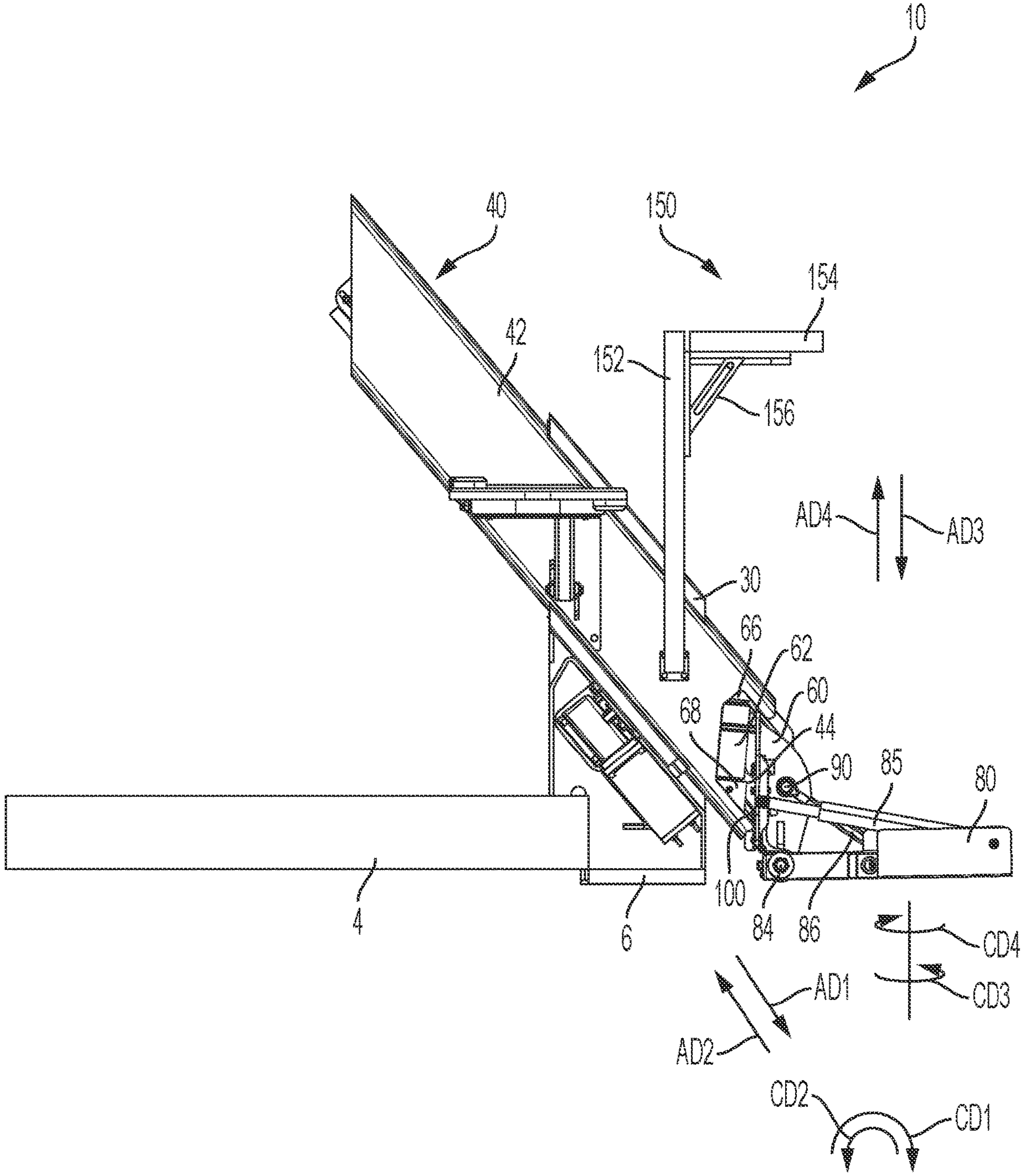
FIG. 4 is a left side elevational view of an extendable lift assembly, in a partially extended position.

FIG. 4 is a left side elevational view of extendable lift assembly 10. As shown in FIG. 4, in some embodiments extendable lift assembly 10 may comprise handle assembly 150 operatively arranged to provide a support rail for a user standing on platform 80. Handle assembly 150 comprises post 152 connected to sliding rail assembly 40 and bar 154 connected to post 152. In some embodiments, bar 154 is connected to post 152 via bracket 156. Bracket 156 allows bar 154 to be collapsed in circumferential direction CD1 when not in use, and rotated in circumferential direction CD2 and locked in place (as shown in FIG. 4) for use. It should be appreciated that bar 154 can be positioned for use or stowed either manually by a user or automatically (e.g., via an electric motor, hydraulics, pneumatics, actuators (e.g., screw drives, etc.).

Figure 5:
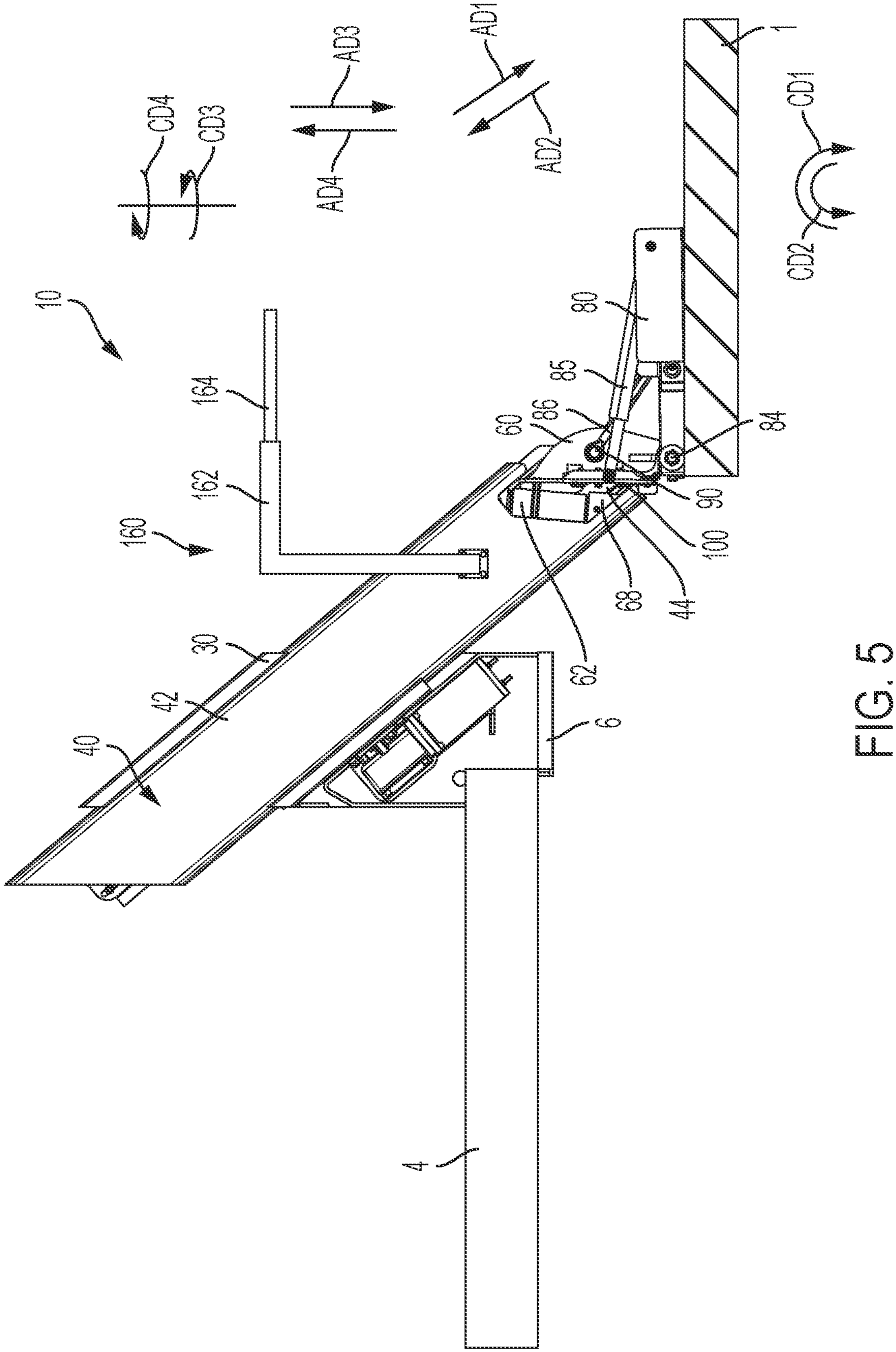
FIG. 5 is a left side elevational view of the extendable lift assembly shown in FIG. 4, in a fully extended position.
Figure 6:
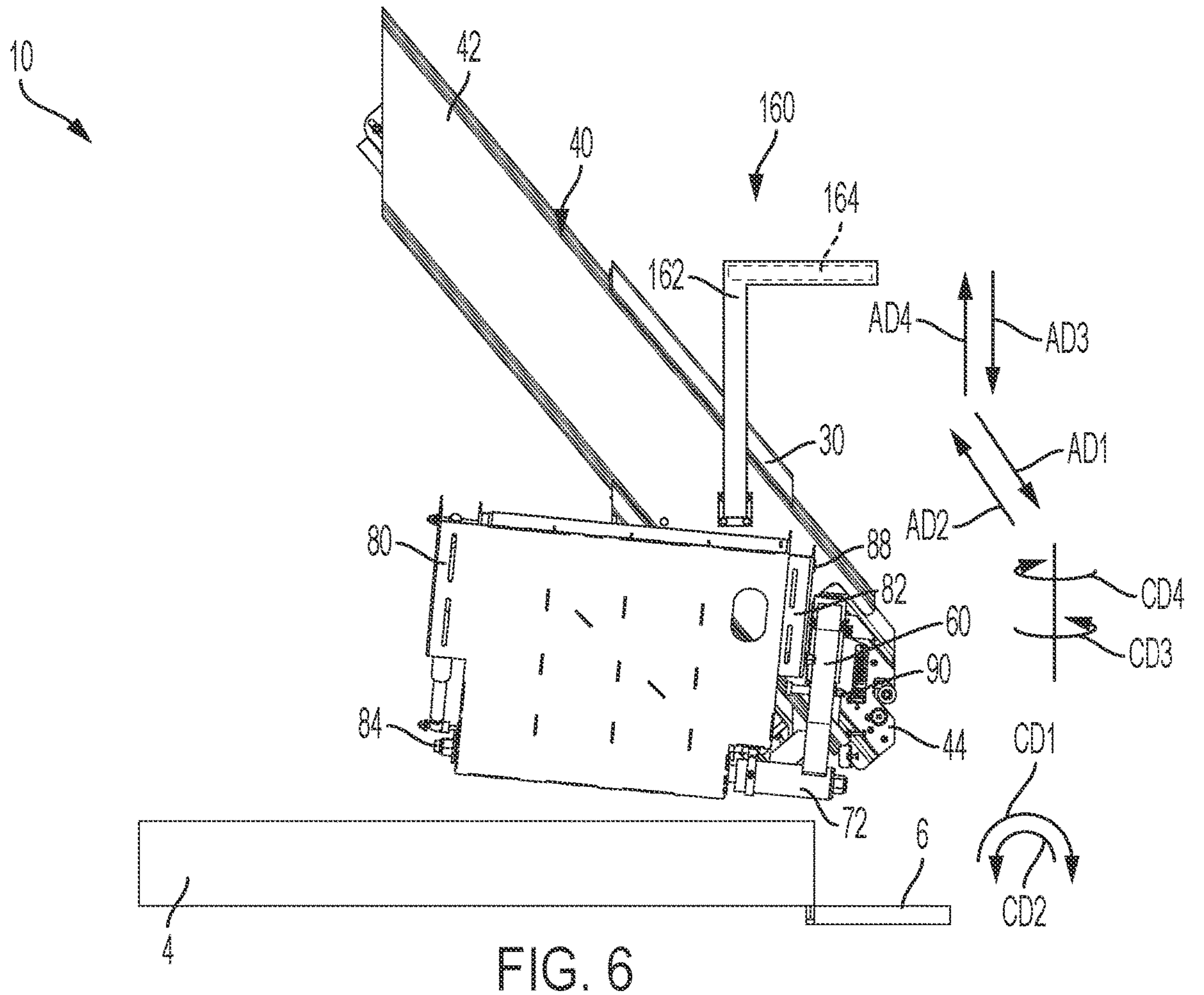
FIG. 6 is a left side elevational view of the extendable lift assembly shown in FIG. 4, in a fully stowed position.

FIG. 5 is a left side elevational view of extendable lift assembly 10. FIG. 6 is a left side elevational view of extendable lift assembly 10, in a stowed position. As shown in FIGS. 5 and 6, in some embodiments extendable lift assembly 10 may comprise handle assembly 160 operatively arranged to provide a support rail for a user standing on platform 80. Handle assembly 160 comprises post 162 connected to sliding rail assembly 40 and bar 164 connected to post 152. In some embodiments, bar 164 is telescopingly connected with post 162. In the use position, as shown in FIG. 5, bar 164 is extended from post 162. In the stowed position, as shown in FIG. 6, bar 164 is retracted substantially within post 162. It should be appreciated that bar 164 can be positioned for use or stowed either manually by a user or automatically (e.g., via an electric motor, hydraulics, pneumatics, actuators (e.g., screw drive), etc.). Also shown in FIGS. 5 and 6 is the use position and the stowed position of platform 80. To shift from the use position shown in FIG. 5 to the stowed position shown in FIG. 6, platform 80 is rotated in circumferential direction CD2 with respect to shaft 84. Then platform 80, and knuckle arm 60, is rotated in circumferential direction CD4 with respect to section 62 and shaft 64 (see FIG. 8) therein. To shift from the stowed position shown in FIG. 6 to the use position shown in FIG. 5, platform 80, and knuckle arm 60, is rotated in circumferential direction CD3 with respect to section 62 and shaft 64 (see FIG. 8) therein. Then platform 80 is rotated in circumferential direction CD1.

Figure 7:
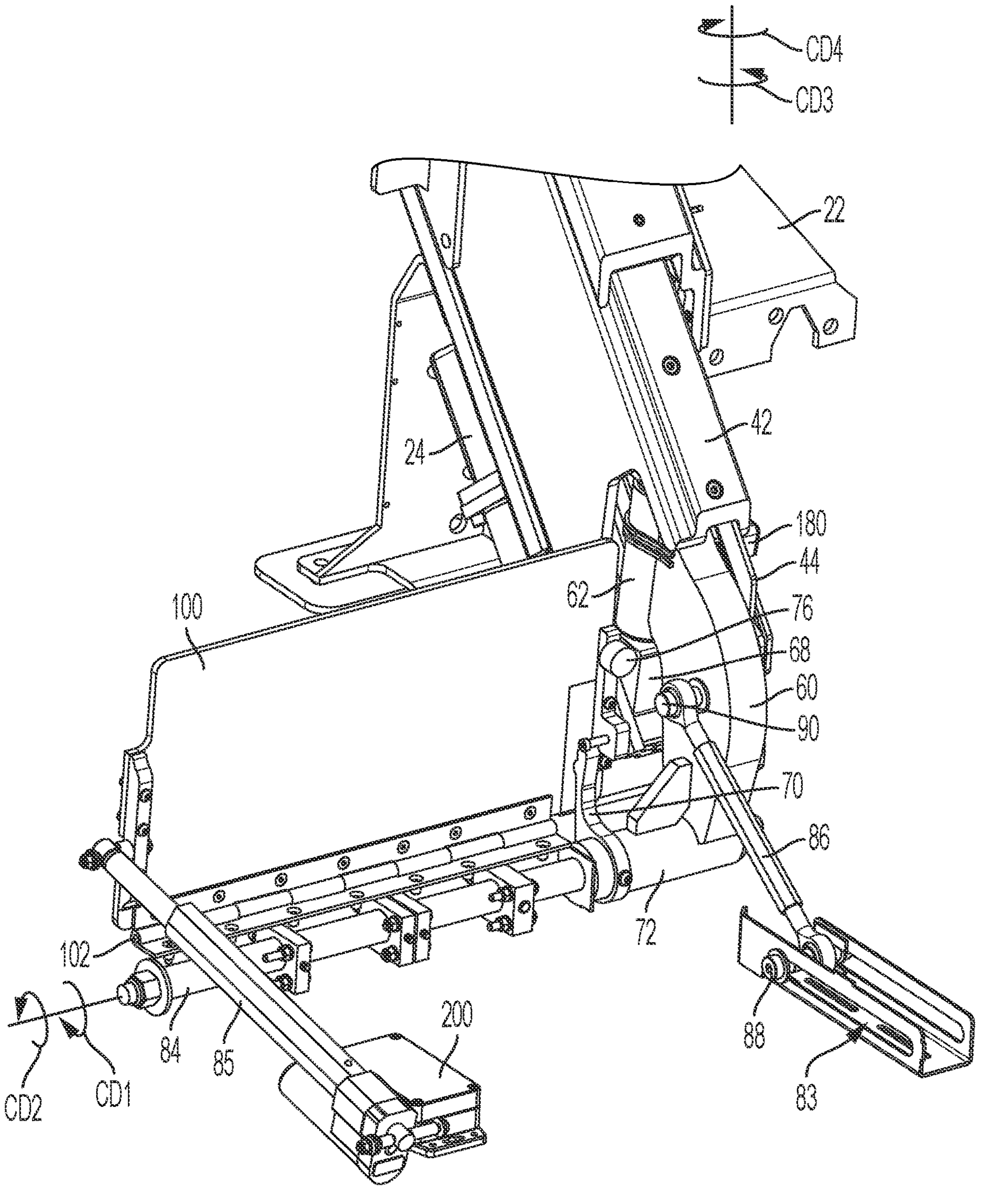
FIG. 7 is a partial perspective view of the extendable lift assembly shown in FIG. 1A.
Figure 8:
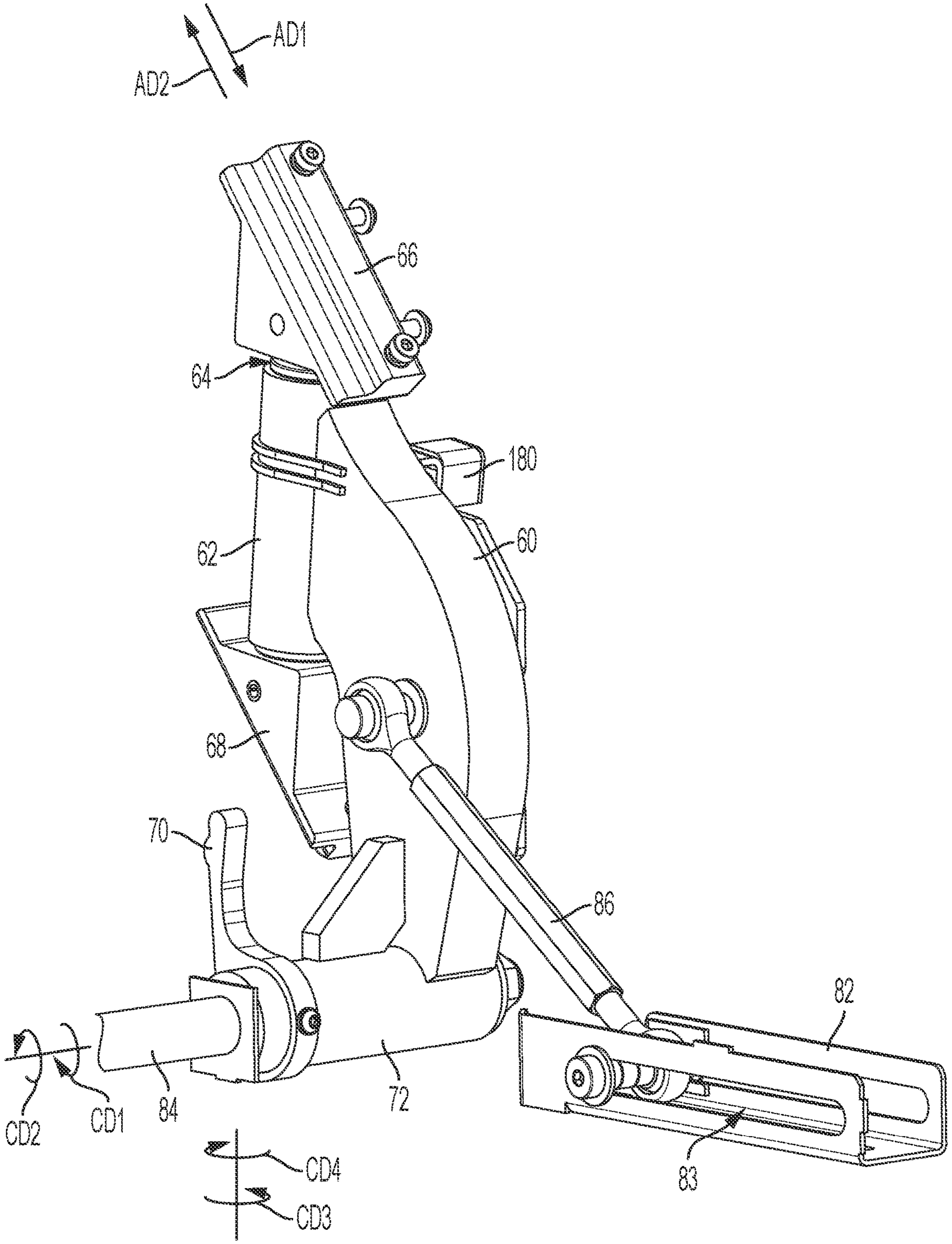
FIG. 8 is a partial perspective view of the extendable lift assembly shown in FIG. 1A.

FIG. 7 is a partial perspective view of extendable lift assembly 10. FIG. 8 is a perspective view of knuckle arm 60. FIG. 9 is a side elevational view of extendable lift assembly 10. The following description should be read in view of FIGS. 1A-9.

Knuckle arm 60 is pivotably connected to sliding rail assembly 40 and platform 80. Knuckle arm 60 comprises section 62 and section 72. Knuckle arm 60 further comprises block 66 and block 68, which are connected to sliding rail assembly 40. In some embodiments, blocks 66 and 68 are fixedly secured to plate 42 via any suitable means, for example, bolts, rivets, screws, adhesives, welding, soldering, interference fit, etc. Shaft 64 extends through section 62 and is connected to blocks 66 and 68. In some embodiments, shaft 64 is non-rotatably connected to blocks 66 and 68 and rotatably connected to section 62. In such embodiments, knuckle arm 60 may further comprise a pull pin operatively arranged to lock knuckle arm 60 with respect to shaft 64, for example, in the stowed or the use position. In some embodiments, section 62 further comprises one or more bearings to encourage rotational motion between section 62 and shaft 64. In some embodiments, shaft 64 is rotatably connected to blocks 66 and 68 and non-rotatably connected to section 62.

Section 72 is rotatably connected to platform 80 via shaft 84. In some embodiments, shaft 84 is rotatably connected to section 72 and non-rotatably connected to platform 80. In such embodiments, knuckle arm 60 may further comprise a pull pin operatively arranged to lock knuckle arm 60 with respect to shaft 84, for example, in the stowed or the use position. In some embodiments, section 72 further comprises one or more bearings to encourage rotational motion between section 72 and shaft 84. In some embodiments, shaft 84 is rotatably connected to platform 80 and non-rotatably connected to section 72. As previously described, stopper 70 is non-rotatably connected to knuckle arm 60, specifically section 72, to limit displacement of bridge plate 100 in circumferential direction CD1. Once bridge plate 100 is engaged with stopper 70, further retraction of actuator 85 causes platform 80 to displace in circumferential direction CD2.

As best shown in FIG. 2, lift assembly 10 further comprises pin 174 and locking plate 170. Pin 174 is fixedly secured to knuckle arm 60. Locking plate 170 is slidably engaged with plate 44 and comprises slot 172, spring 176, and surface 178. In the locked position, and as shown in FIG. 2, locking plate 170 is displaced in axial direction AD3 and slot 172 is fully engaged with pin 174 thereby rotatably locking knuckle arm 60 with respect to plate 44 (i.e., sliding rail assembly 40). In this fully locked position, knuckle arm 60 cannot be displaced in circumferential direction CD3 or CD4. In an unlocked position (not shown), locking plate 170 is displaced in axial direction AD4 such that slot 172 completely disengages pin 174 thereby allowing knuckle arm 60 to be displaced in circumferential direction CD3 and/or CD4. In some embodiments, as sliding rail assembly 40 is displaced in axial direction AD2 to be stowed, surface 178 engages insert 50 (or another component of sliding rail assembly 40), thereby forcing locking plate 170 in axial direction AD4 and out of engagement with pin 174, allowing rotational displacement of knuckle arm 60 with respect to sliding rail assembly 40. Spring 176 is connects locking plate 170 and plate 44 and biases locking plate 170 in axial direction AD3, or toward the locked position. It should be appreciated that when a passenger is standing or sitting on platform 80 and/or platform 110, locking plate 170 will be in the locked position (i.e., fully engaged with pin 174) due to the weight of the passenger forcing locking plate 170 in axial direction AD3. Locking plate 170 is operatively arranged to automatically lock and unlock knuckle arm 60 rotationally with respect to sliding rail assembly 40.

Knuckle arm 60 further comprises arm 180 which is pivotably connected to knuckle arm 60 via shaft 182. Arm 180 is specifically connected to section 62 and may include a slide plate and/or a block. Arm 180 is operatively arranged to engage slot 190 in static rail 30 to displace knuckle arm 60 in circumferential direction CD4. To put lift assembly 10 in the stowed position, sliding rail assembly 40 is displaced in axial direction AD2. Knuckle arm 60 is rotationally unlocked from sliding rail assembly 40 as locking plate 170 is displaced in axial direction AD4, thereby disengaging slot 172 from pin 174. Arm 180 then engages slot 190. As sliding rail assembly 40 continues displacing in axial direction AD2, arm 180 remains behind pulling on shaft 182 thereby displacing knuckle arm 60 in circumferential direction CD4 to the stowed position (i.e., arm 180 acts as a lever arm on section 62). Arm 180 is further connected to plate 44 via spring 186. To put lift in the use position, as shown in FIGS. 1A-2, sliding rail assembly 40 is displaced in axial direction AD1. As arm 180 disengages from slot 190, spring 186 biases arm toward plate 44 thereby displacing knuckle arm 60 in circumferential direction CD3. In some embodiments, arm 180 further comprises stopper 184 to limit displacement of arm 180.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Ground surface
4 Vehicle floor
6 Step(s)
20 Lift assembly
22 Motor assembly
22 Motor housing
24 Motor
26 Gear
28 Gear engagement lever
30 Static rail
32 Channel
34 Channel
40 Sliding rail assembly
42 Plate
44 Plate
46 Rack
48 Insert
50 Insert
60 Knuckle arm
62 Section
64 Shaft
66 Block
68 Block
70 Bumper
72 Section
76 Bumper
80 Platform
82 Plate
83 Channel
84 Shaft
85 Actuator
86 Rod
88 Shaft
90 Shaft
100 Bridge plate
102 Hinge
110 Platform
112 Hinge
150 Post
152 Bar
154 Bracket
160 Handle assembly
162 Post
164 Bar
170 Locking plate
172 Slot
174 Pin
176 Spring
178 Surface
180 Arm or block
182 Shaft
184 Stopper
186 Spring
190 Slot
200 Microcontroller
AD1 Axial direction
AD2 Axial direction
AD3 Axial direction
AD4 Axial direction
CD1 Circumferential direction
CD2 Circumferential direction
CD3 Circumferential direction
CD4 Circumferential direction

What is claimed is:

1. An extendable lift assembly for a vehicle, comprising:
a sliding rail assembly, including:
a plate slidably connected to the vehicle; and
an arm pivotably connected to the plate;
a first platform pivotably connected to the arm; and
a second platform extending from and pivotably connected to the plate, wherein the second platform is a seat for a user and is spaced apart from the first platform along the plate.

2. The extendable lift assembly as recited in claim 1, further comprising a static rail operatively arranged to be fixedly secured to the vehicle, wherein the plate is slidingly connected to the static rail.

3. The extendable lift assembly as recited in claim 2, further comprising a motor including a gear, wherein the motor and the gear are operatively arranged to displace the plate with respect to the static rail.

4. The extendable lift assembly as recited in claim 3, further comprising a rack connected to the plate, wherein the gear is operatively arranged to engage the rack.

5. The extendable lift assembly as recited in claim 4, further comprising a lever operatively arranged to engage and disengage the gear from the rack.

6. The extendable lift assembly as recited in claim 2, wherein:
the arm comprises an engaging member pivotably connected thereto; and
the static rail comprises a slot, wherein the engaging member is operatively arranged to engage the slot to circumferentially displace the arm.

7. The extendable lift assembly as recited in claim 1, wherein the first platform is connected to the arm via a shaft.

8. The extendable lift assembly as recited in claim 7, wherein the first platform is further connected to the arm via a rod, the rod being pivotably connected to the arm and pivotably and slidably connected to the first platform.

9. The extendable lift assembly as recited in claim 1, wherein the arm is connected to the plate via a shaft.

10. The extendable lift assembly as recited in claim 1, wherein:
- the first platform is rotatable in a first circumferential direction relative to the arm and a second circumferential direction, opposite the first circumferential direction; and
- the arm is rotatable in a third circumferential direction relative to the plate and a fourth circumferential direction, opposite the third circumferential direction.

11. The extendable lift assembly as recited in claim 1, further comprising a bridge plate hingedly connected to the first platform.

12. The extendable lift assembly as recited in claim 11, further comprising an actuator connected at a first end to the bridge plate and at a second end to the first platform, the actuator operatively arranged to circumferentially displace both the bridge plate and the first platform.

13. The extendable lift assembly as recited in claim 1, further comprising:
- a locking plate slidably connected to the plate; and
- a pin connected to the arm, wherein the locking plate is operatively arranged to engage the pin to non-rotatably connect the arm and the plate.

14. The extendable lift assembly as recited in claim 1, further comprising a drive mechanism operatively arranged to displace the plate with respect to the static rail to extend and retract the plate.

15. An extendable lift assembly for a vehicle operatively arranged to extend from proximate a floor of the vehicle to proximate a ground surface, the extendable lift assembly comprising:
- a sliding rail assembly, including:
  - a plate slidably connected to the vehicle; and
  - an arm pivotably connected to the plate;
- a first platform pivotably connected to the arm;
- a second platform pivotably connected to the plate; and
- a drive mechanism operatively arranged to displace the sliding rail assembly with respect to the vehicle.

16. The extendable lift assembly as recited in claim 15, wherein at least one of the first platform and the second platform is operatively arranged to carry a user into and out of the vehicle.

17. The extendable lift assembly as recited in claim 15, wherein:
- the first platform is rotatable in a first circumferential direction relative to the plate and a second circumferential direction, opposite the first circumferential direction; and
- the first platform is rotatable in a third circumferential direction relative to the plate and a fourth circumferential direction, opposite the third circumferential direction.

18. The extendable lift assembly as recited in claim 17, wherein the second platform is rotatable in a fifth circumferential direction relative to the plate and a sixth circumferential direction, opposite the fifth circumferential direction.

19. An extendable lift assembly for a motor vehicle, comprising:
- a sliding rail assembly, including:
  - a plate slidably connected to the vehicle; and
  - an arm pivotably connected to the plate;
- a first platform extending from and pivotably connected to the arm; and
- a second platform extending from and pivotably connected to the plate, wherein the second platform is spaced apart from the first platform along the plate.

20. The extendable lift assembly as recited in claim 19, further comprising a bridge plate hingedly connected to the first platform.

* * * * *